US010022636B2

(12) United States Patent
Schluesselberger et al.

(10) Patent No.: US 10,022,636 B2
(45) Date of Patent: Jul. 17, 2018

(54) DEVICE FOR SPATIAL MOVEMENT OF AT LEAST ONE PERSON

(71) Applicant: AMST-SYSTEMTECHNIK GMBH, Ranshofen (AT)

(72) Inventors: Rainer Schluesselberger, Ranshofen (AT); Richard Schluesselberger Jun., Braunau Am Inn (AT); Michael Mayrhofer, Ranshofen (AT)

(73) Assignee: AMST-Systemtechnik GmbH, Ranshofen (AT)

( * ) Notice: Subject to any disclaimer, the term of this patent is extended or adjusted under 35 U.S.C. 154(b) by 0 days.

(21) Appl. No.: 15/500,380

(22) PCT Filed: Jul. 27, 2015

(86) PCT No.: PCT/EP2015/067128
§ 371 (c)(1),
(2) Date: Jan. 30, 2017

(87) PCT Pub. No.: WO2016/016177
PCT Pub. Date: Feb. 4, 2016

(65) Prior Publication Data
US 2017/0216731 A1 Aug. 3, 2017

(30) Foreign Application Priority Data
Jul. 29, 2014 (AT) .................... 600/2014

(51) Int. Cl.
*A63G 31/16* (2006.01)
*G09B 9/02* (2006.01)
*G09B 9/12* (2006.01)

(52) U.S. Cl.
CPC .............. *A63G 31/16* (2013.01); *G09B 9/02* (2013.01); *G09B 9/12* (2013.01)

(58) Field of Classification Search
CPC .......... A63G 1/00; A63G 31/00; A63G 31/16; G09B 9/00; G09B 9/02; G09B 9/08; G09B 9/12
(Continued)

(56) References Cited

U.S. PATENT DOCUMENTS 4,710,128 A * 12/1987 Wachsmuth ............ G09B 9/12
434/30
8,038,541 B1 * 10/2011 Solomon ................. A63G 1/00
472/1
(Continued)

FOREIGN PATENT DOCUMENTS

AT 507373 A1 4/2010
WO 2012160022 A1 11/2012

OTHER PUBLICATIONS

Anonymous, "The GL-6000 Gryphon (TM)", Falcon TM Aircrew Training the Future of Human Factors Training & Research, (Sep. 30, 2012), pp. 1-2, URL: http://etctacticalflight.com/wp-content/media/product/pdf/ETC-GL6000-Brochure.pdf, (Sep. 18, 2015), XP055214490 [I] 1-3,37 pp. 1-2.
(Continued)

*Primary Examiner* — Kien Nguyen
(74) *Attorney, Agent, or Firm* — Laurence A. Greenberg; Werner H. Stemer; Ralph E. Locher

(57) ABSTRACT

A flight simulator, motion simulator or orientation simulator for the spatial movement of at least one person, and in particular for the simulation of acceleration sequences, has a holding device for holding a person in a region of the center. The holding device is mounted on a carriage via a movement device. The carriage can be displaced, in particular linearly, along a horizontally oriented main carrier. The main carrier is rotationally driven about a vertically oriented major axis of rotation and the center is displaceable between a first outer maximum position and a second outer maximum
(Continued)

position by moving the carriage along a trajectory on the main carrier. A normal distance between the first outer maximum position of the center and the major axis of rotation is greater than the normal distance between the second outer maximum position of the center and the major axis of rotation.

37 Claims, 4 Drawing Sheets

(58) Field of Classification Search
USPC .................. 472/1, 59–61, 130; 434/29, 55
See application file for complete search history.

(56) References Cited

U.S. PATENT DOCUMENTS

| | | | |
|---|---|---|---|
| 8,356,996 B2* | 1/2013 | Mayrhofer | G09B 9/12 434/55 |
| 2010/0105012 A1 | 4/2010 | Mayrhofer | |
| 2010/0216097 A1* | 8/2010 | Romagnoli | G09B 9/02 434/35 |

OTHER PUBLICATIONS

Scott T. Glaser, et al.; G-Pointing: Articulated Centrifuge for Real-Time G Flight Simulation; p. 1-8; Internet: https://www.simaimix.com/images/Research-Papers/G-Pointing-Paper.pdf.

* cited by examiner

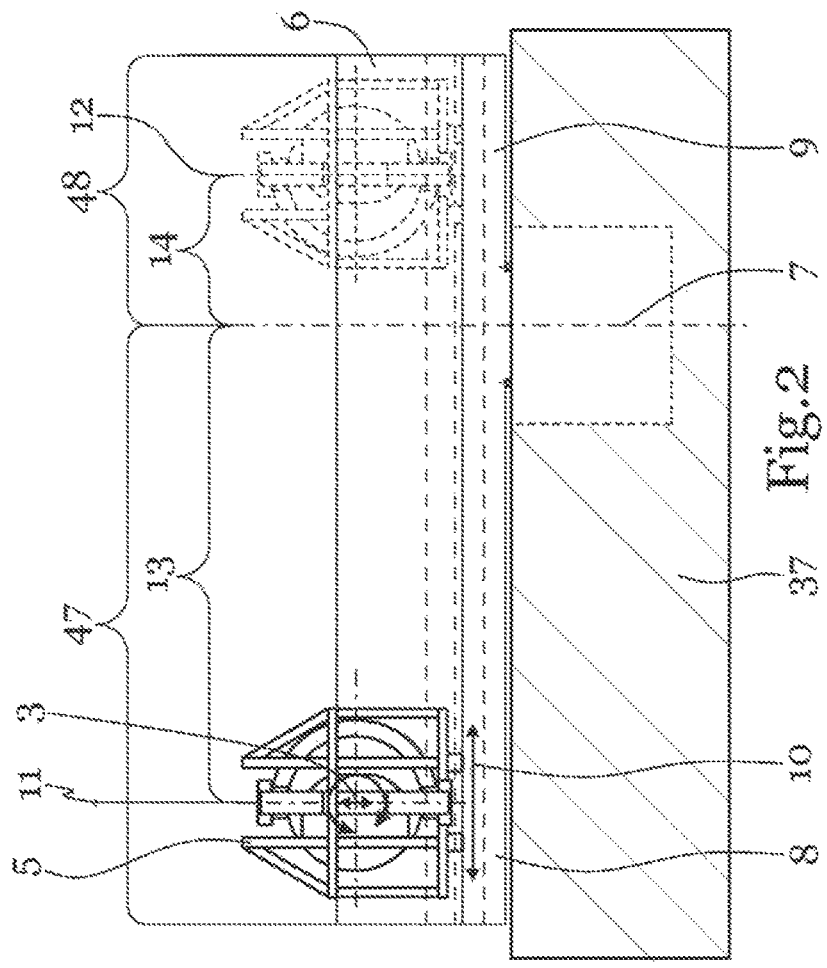
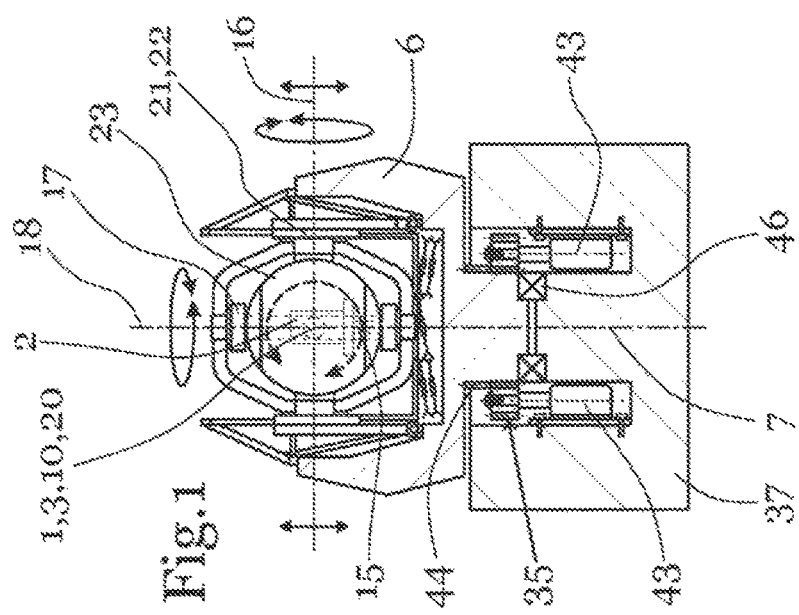

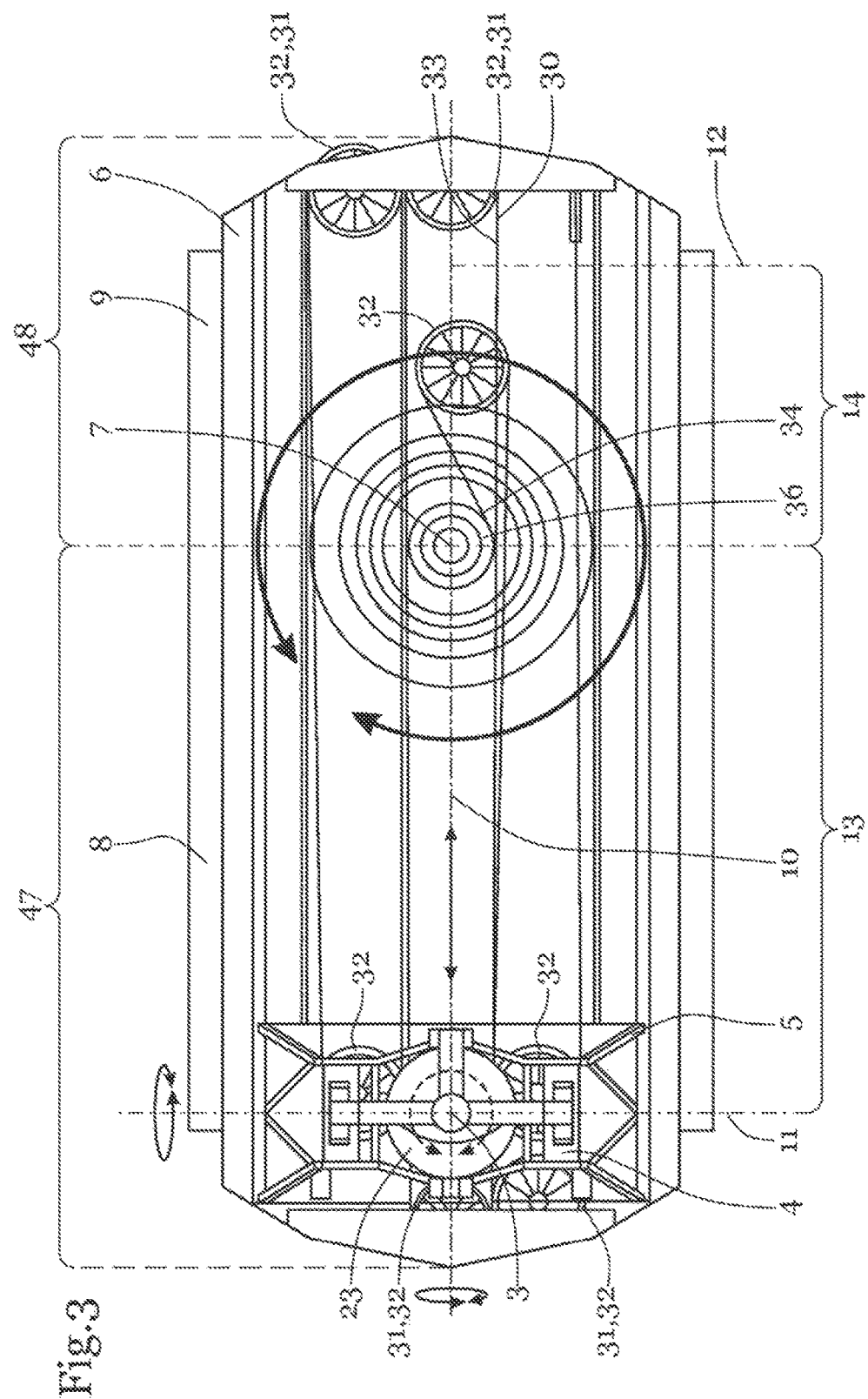

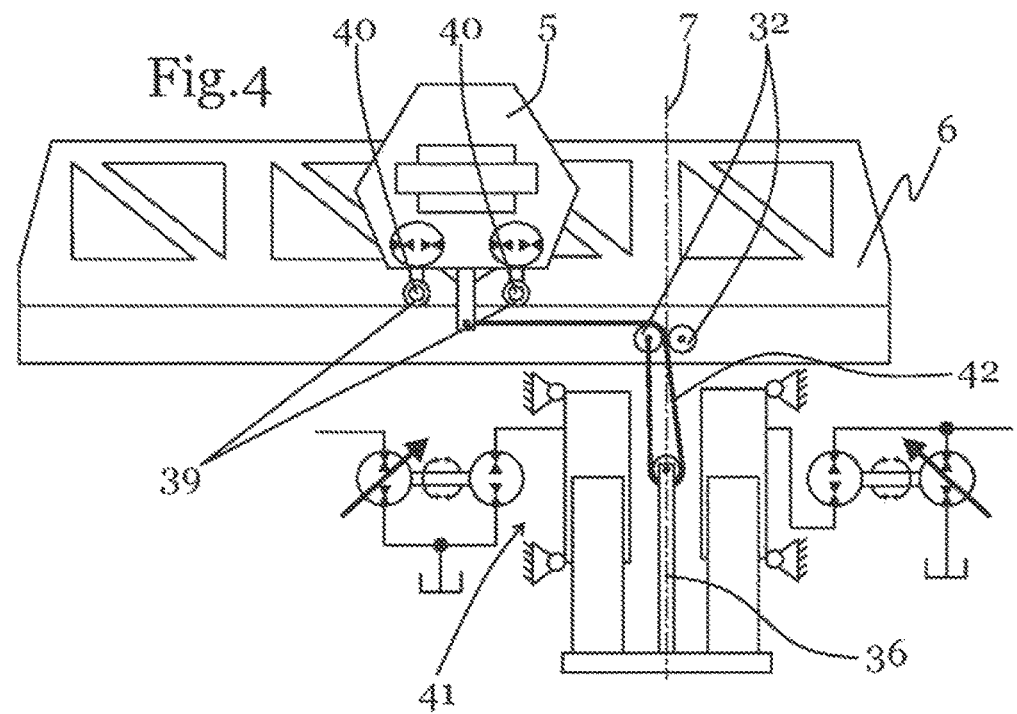
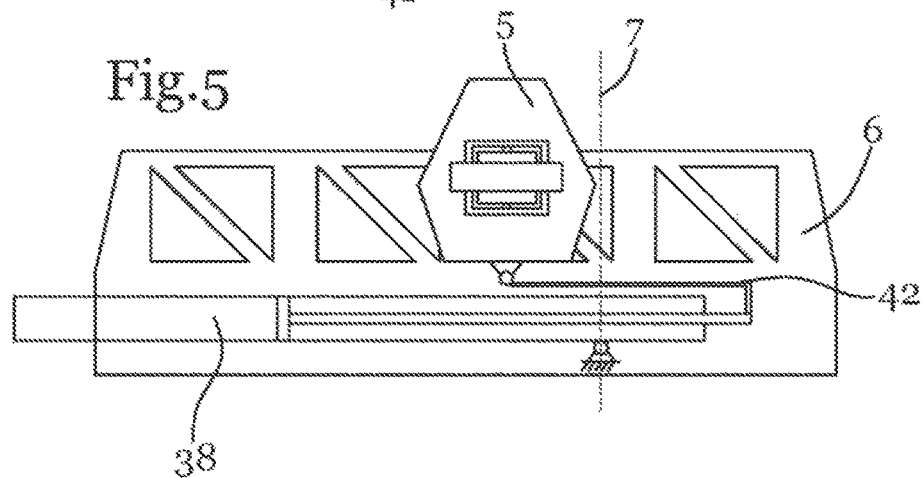
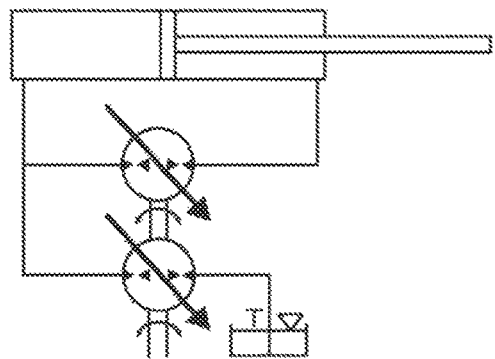

DEVICE FOR SPATIAL MOVEMENT OF AT LEAST ONE PERSON

BACKGROUND OF THE INVENTION

Field of the Invention

The invention relates to a device for the spatial movement of at least one person, and in particular for simulating acceleration conditions or acceleration sequences.

Where appropriate, the device may be a system that comprises a plurality of components which are configured to enable a spatial movement of a person. In accordance with a preferred embodiment, the device or system according to the invention is designed as a flight simulator, motion simulator or orientation simulator.

The device according to the invention is preferably used for simulating moving objects, such as aeroplanes, helicopters, motor cars, ships or similar objects. When the device is in use, a person located in a cabin or a hollow body is presented with a virtual reality experience using a plurality of artificially generated sensory perceptions. These sensory stimuli include audio-visual stimuli that are fed to the user via image reproduction systems and audio reproduction systems. In addition the device according to the invention is preferably used to generate accelerations, torques and/or forces that act on the user. Through the combination of audiovisual, visual, kinematic, kinetic and/or physical sensations, the human brain interprets virtual states of motion and acceleration. The more precisely the sensory perceptions simulate the actual sensory perceptions produced in such situations, the more realistic this interpretation appears to the user. For this reason, it is advantageous to feed these signals to the user in a manner as faithful to human perception as possible. The device also preferably comprises the facility for the person to exert some influence on the simulation. By exerting this influence the person can, for example, control the movement of the simulated object in the virtual, simulated world, as well as the movement of the device itself.

The control signals produced by the person and any environmental effects such as wind, unevennesses in the track etc., are preferably fed to a physical simulation model which matches, or at least closely resembles, a mathematical representation of the actual behaviour of the simulated object. It includes variables such as the moments of inertia, resistances, etc. This model is used as a basis for calculating, in particular, the accelerations, moments and/or forces and their directions which will be fed to the user in the virtual world. This is effected by controlling different drives by means of a control unit or a control system.

To enable acceleration states, and in particular acceleration changes, to be simulated in as perceptually faithful a manner as possible, it is advantageous if both the amplitude and the frequency and/or profile of an acceleration sequence can be reproduced as accurately or perceptually faithfully as possible, and can therefore be simulated. In flight simulators, for example, for realistic simulation of a stable flight position, relatively small changes in acceleration must be accurately simulated over time. On the other hand, for simulating highly dynamic manoeuvres with high accelerations, such as extreme changes of direction, high accelerations and rapid acceleration changes must be simulated.

For example, according to the invention accelerations of more than or up to 2, 3, 4, 5, 6, 7, 8 or 9 g can be reproduced. To be able to simulate rapid manoeuvres in a perceptually faithful way, the possible temporal gradient of the acceleration should, for example, be more than or up to 1 g/s, 2 g/s, 3 g/s. The unit g is defined as the acceleration due to gravity, or a multiple of the acceleration due to gravity. Changes in the direction of acceleration, for example, 180° changes in orientation of the acceleration with a frequency of over 2 Hz must also be displayed.

In accordance with the prior art, two-arm centrifuges are known for simulating such a range of different motion and acceleration states. Conventional two-arm centrifuges comprise an elongated, rail-shaped cage, which is rotated centrally about a rotational axis. A carriage in which a person is seated can be moved in the cage. In accordance with the prior art, the rotatable cage is arranged symmetrically about a major axis of rotation. By rotating the cage and simultaneously displacing the carriage from the neutral central position to one or the other side of the axis of rotation, accelerations in different directions can be generated for the person. A disadvantage of traditional two-arm centrifuges is that, because of their large mass, they are not suitable for generating accelerations of more than 3 g in a perceptually faithful manner, because the required angular velocity of the rotation of the cage generates unrealistic, or not perceptually faithful, secondary forces or interfering forces. Also, increasing the arm length of the cantilevered arms of a conventional system on both sides does not produce any improvement, since the enlargement of the conventional system causes the inertia to increase and thus the mechanical strength limits of the centrifuge to be exceeded.

To simulate higher accelerations in the range of over 3 g, single-arm centrifuges are used in accordance with the prior art. In a single-arm centrifuge, a cabin is arranged on the outer end of a cantilevered arm so that it can be rotated at a normal distance about a major axis of rotation, but cannot be displaced. It is true that high accelerations can be simulated with a single-arm centrifuge of this kind. Rapidly changing small accelerations and rapidly changing acceleration directions, however, e.g. changes in orientation of the acceleration by 180°, such as occur in a car during slalom driving or in static flight situations and which essentially take place under normal (simple) acceleration due to gravity, cannot be simulated with sufficient accuracy in single-arm centrifuges.

Thus, in devices for the spatial movement of a person and in particular in the case of movement, acceleration or orientation simulators, conflicting objectives exist between perceptually faithful representation of high-frequency small acceleration changes that may tend to occur under simple acceleration due to gravity, and perceptually faithful representation of high accelerations and high acceleration gradients, which may also occur with high frequency.

SUMMARY OF THE INVENTION

The object of the invention is, in particular, to reconcile these conflicting objectives.

The object according to the invention is achieved by the features of the independent patent claims.

The invention relates in particular to a device, in particular a flight simulator, motion simulator or orientation simulator, for the spatial movement of at least one person and in particular for the simulation of acceleration sequences, wherein a holding device for holding a person in the region of a centre is provided, wherein the holding device is mounted on a carriage by means of a movement device, wherein the carriage can be moved along a (preferably horizontally oriented) main carrier and in particular is linearly displaceable, wherein the main carrier is mounted so that it can be rotated about a (preferably vertically oriented) major axis of rotation, can be driven and possibly is driven by a main drive, wherein the main carrier comprises a first main arm and a second main arm, wherein the two main arms extend radially outwards in opposite directions from the major axis of rotation, wherein the centre is displaceable between a first outer maximum position and a second outer maximum position by displacing the carriage along a trajectory on the main carrier, wherein in the first outer maximum position of the centre the carriage is arranged on the first main arm, wherein in the second outer maximum position of the centre the carriage is arranged on the second main arm, and wherein the normal distance between the first outer maximum position of the centre and the major axis of rotation is greater than the normal distance between the second outer maximum position of the centre and the major axis of rotation. It may be provided that the trajectory of the centre along the main carrier is limited by the first outer maximum position and the second outer maximum position. It may be provided that the first main arm, measured normally with respect to the major axis of rotation, is longer than the second main arm or that the major axis of rotation is arranged asymmetrically relative to the main carrier along the longitudinal extension of the main carrier. It may be provided that the main carrier has a trough-shaped or U-shaped profile along the trajectory, and that the carriage is guided on or in the main carrier and at least partially encompassed by the main carrier. As appropriate, the invention also relates to a movement device and/or a cabin for one person. It may be provided that the movement device comprises a first carrier element, which is arranged such that it is or can be rigidly connected to the holding device, that the first carrier element is or can be driven relative to the carriage about a first secondary axis, and/or that the first secondary axis passes through the centre. It may be provided that the movement device comprises a first carrier element, which is arranged such that it is or can be rigidly connected to the holding device, that the first carrier element is or can be rotatably driven relative to the carriage about a first secondary axis, that the first secondary axis passes through the centre, that the movement device comprises a second carrier element, that the first carrier element is or can be rotatably driven relative to the second carrier element about the first secondary axis, and that the second carrier element is or can be rotatably driven relative to the carriage about a second secondary axis, that the first secondary axis and the second secondary axis extend substantially orthogonally to each other and that the first secondary axis and the second secondary axis have the smallest normal distance from each other in the centre or intersect in the centre. It may be provided that the movement device comprises a first carrier element, which is arranged such that it is or can be rigidly connected to the holding device, that the first carrier element is or can be rotatably driven relative to the carriage about a first secondary axis, that the first secondary axis passes through the centre, that the movement device comprises a second carrier element, that the first carrier element is or can be rotatably driven relative to the second carrier element about the first secondary axis, that the second carrier element is or can be rotatably driven relative to the carriage about a second secondary axis, that the first secondary axis and the second secondary axis extend substantially orthogonally to each other, that the first secondary axis and the second secondary axis have the smallest normal distance from each other in the centre or intersect in the centre, that the movement device comprises a third carrier element, that the second carrier element is or can be rotatably driven relative to the third carrier element about the second secondary axis, that the third carrier element is or can be rotatably driven relative to the carriage about a third secondary axis, that the second secondary axis and the third secondary axis extend substantially orthogonal to each other and that the second secondary axis and the third secondary axis have the smallest normal distance from each other in the centre or intersect in the centre. It may be provided that the movement device comprises a hoisting device for the translational, and in particular the linear movement, of the holding device, the holding device, the first carrier element, the second carrier element and/or, if appropriate, the third carrier element.

It may be provided that the movement device of the hoisting device extends substantially parallel to the major axis of rotation and/or normally to the trajectory, and that the hoisting device comprises one or more linear drives, such as in particular a electrical or hydraulic linear drive, or a parallel kinematics arrangement. It may be provided that the holding device is positioned in a cabin and that an image reproduction surface is provided in the cabin for the graphical representation of a simulated environment. It may be provided that a replica of an object to be simulated is provided in the cabin, wherein the replica of the object to be simulated is, in particular, the replica of an aircraft cockpit, a vehicle cockpit, a helicopter cockpit or a ship's cockpit. It may be provided that control elements are provided in the region of the holding device, that the controls are connected to a control device and/or a data processing system such as a computer, that the movement of the device and, in particular, the simulation can be influenced using the control elements, so that the person in the cabin can steer the simulated object or the movement of the device. It may be provided that the cabin is designed so that it is or can be closed, and that the cabin comprises a cabin opening which can be closed off by a cabin door.

It may be provided that the image reproduction surface and/or the cabin is provided on the second carrier element or, where appropriate, the third carrier element, so that the holding device has at least one drivable rotational degree of freedom relative to the image reproduction surface and/or the cabin. It may be provided that the second carrier element is designed annularly or C-shaped and is rigidly connected to the cabin, or that the second carrier element comprises an annular or C-shaped section and the cabin is part of the second carrier element. If appropriate, the third carrier element may be designed annularly and extend around the cabin. It may be provided that the third carrier element is designed annularly and extends around the cabin, and that recesses for accommodating rotary drives are provided in the third carrier element, wherein the rotary drives provided in the third carrier element are configured to rotate the second carrier element about the second secondary axis and to rotate the third carrier element about the third secondary axis. It may be provided that the hoisting device engages on the third carrier element, and in particular in the region of the third secondary axis. It may be provided that the first carrier element is designed as a cantilever which is rotatably connected on one side, in particular behind the holding device, to the second carrier element, so that the first carrier element extends behind and/or below the person from the holding device to the second carrier element. It may be provided that the carriage can be displaced on the main carrier using a carriage drive device. It may be provided that the carriage is displaceable on the main carrier using a carriage drive device, wherein the carriage drive device is designed as a cable drive, as a hydraulic drive, as a direct drive or as a direct drive with radial load compensation. It may be provided that the carriage drive device is designed as a cable drive, which comprises the following elements: a cable passed around a plurality of deflection pulleys, which is partially fixed to the main carrier and is preferably fixed to or engages on the main carrier with one end, with both ends or with at least one section;

main carrier deflection pulleys, which are rotatably mounted on the main carrier, wherein the main carrier deflection pulleys are arranged on both outer regions of the main carrier; or possibly at least one, preferably two deflection pulleys, which are rotatably mounted on the carriage; a cable drive pulley for driving the cable drive.

It may be provided that the cable drive pulley is arranged coaxially with the major axis of rotation of the main drive, wherein when the carriage is stationary with respect to the main carrier, the cable drive pulley and the main drive have the same angular velocity, and wherein to move the carriage on the main carrier the cable drive pulley and the main drive have an angular velocity difference. It may be provided that the drive for the cable drive pulley is arranged in a fixed position, and in particular in a fixed position in the foundation. It may be provided that the carriage drive device is designed as a hydraulic drive device, wherein the drive for displacing the carriage on the main carrier is provided by a hydraulic cylinder.

It may be provided that the carriage drive device is designed as a direct drive, wherein the direct drive comprises drive wheels which are mounted on the carriage so that they can be rotated and driven, wherein the drive wheels roll over parts of the main carrier to cause a displacement of the carriage with respect to the main carrier, and wherein the drives for the drive wheels connected to the carriage are arranged on the carriage itself. It may be provided that the carriage drive device is designed as a direct drive with additional radial load compensation, wherein a radial load compensation drive is arranged in a fixed position and in particular in the foundation, wherein one or more traction elements extend from this radial load compensation drive as far as the carriage and in particular, is or are connected to the carriage at one end, so that the traction element primarily compensates the radial acceleration, in particular in order to generate a counter-force to the radial acceleration, and a functional separation is created between "holding" the carriage due to the radial load compensation and "moving" the carriage due to the direct drive. It may be provided that the traction element or traction elements is or are guided into the main carrier in the region of the major axis of rotation. It may be provided that the traction element or traction elements is or are designed as a block and tackle. It may be provided that the main drive for rotating the main carrier about the major axis of rotation comprises a hydraulic main carrier drive or an electric main carrier drive. It may be provided that the main drive comprises a plurality of main carrier drives, for example 2, 3, 4, 5, 6, 7, 8, 9, 10, 11, 12, 13, 14, 15, 16, 17, 18, 19, 20, 21, 22 or more main carrier drives. It may be provided that the main carrier drives engage with a central element connected to the main carrier by way of a sprocket and/or friction rings, in order to drive the main carrier in a rotary manner about its major axis of rotation. It may be provided that the first secondary axis corresponds to the roll axis of the person. It may be provided that the normal distance of the centre from the major axis of rotation in the first outer maximum position is between 4 and 8 meters, between 5 and 7 meters and/or approximately 6 meters. It may be provided that the distance from the centre to the major axis of rotation in the second outer maximum position is between 0 and 8 meters, between 0.2 and 4 meters, between 0.5 and 4 meters, between 1 and 3 meters and/or in particular approximately 0.2 meters; 0.5 meters; 1 m, 1.5 m and 2 m; or in particular 3 meters. It may be provided that the normal distance of the centre from the major axis of rotation in the first outer maximum position is at least 2 times, in particular between 2 and 4 times, 3 times, 5 times, 10 times, 20 times or in particular 100 times larger than the normal distance of the centre from the major axis of rotation in the second outer maximum position. The invention relates in particular to a device, in particular a flight simulator or motion simulator, for the spatial movement of at least one person and in particular, for the simulation of acceleration sequences, in particular according to any of the previous claims, comprising a holding device for holding a person in the region of a centre, wherein the holding device is mounted on a carriage by means of a movement device, wherein the carriage can be displaced, and in particular linearly displaced, along a horizontally oriented main carrier, wherein the main carrier is mounted so that it can be rotated, can be driven and possibly is driven about a vertically oriented major axis of rotation, wherein the main carrier comprises a first main arm and a second main arm, wherein the two main arms extend radially outwards in opposite directions from the major axis of rotation, wherein the carriage is displaceable between a first outer maximum position and a second outer maximum position, wherein the first main arm measured normally to the major axis of rotation is longer than the second main arm and/or or wherein the major axis of rotation is arranged asymmetrically along the longitudinal extension of the main carrier relative to the main carrier.

The invention relates in particular to a device, for example a flight simulator or a motion simulator, for the spatial movement of at least one person and in particular for the simulation of acceleration states, comprising:

a (possibly horizontally oriented) main carrier, which is rotatably mounted, can be driven and preferably is driven about a (possibly vertically oriented) major axis of rotation, wherein the main carrier comprises a first main carrier section and a second main carrier section which extend radially outwards in opposite directions from the major axis of rotation; a carriage which can be displaced along a trajectory along the main carrier and in particular along the first main carrier section and the second main carrier section, wherein the trajectory extends from a first maximum position in the region of the outer end of the first main carrier section via the major axis of rotation and continues to a second maximum position in the region of the outer end of the second main carrier section, and in particular extends substantially linearly, intersecting, completely intersecting or substantially intersecting the major axis of rotation; a holding device for accommodating, placing or fastening a person in the region of a centre, wherein the holding device is connected to the carriage via a movement device, wherein the first main carrier section is designed longer than the second main carrier section, and/or wherein the centre has a larger normal distance from the major axis of rotation in the first maximum position than in the second maximum position.

Below, exemplary parameters, embodiments and variation possibilities of a device according to the invention are discussed further:

the device may be designed in such a way that a G-force of up to or approximately 7 g acting continuously on the person can be generated. The achievable increase or gradient of the continuously generated G-force per unit of time may be approximately 3 g/second, so that by the rotation of the main carrier alone the person can be accelerated from 1 g to 4 g in one second and from 1 g to 7 g in two seconds.

To achieve this or similar acceleration values, the normal distance of the first outer maximum position of the centre, which is located in the region of the person, from the major axis of rotation is, for example, approximately six meters. The distance of the second outer maximum position of the centre from the major axis of rotation is, for example, approximately two meters.

The carriage mass is, for example, 8 to 16 tonnes, possibly up to 12 tonnes. The maximum radial acceleration acting on the person may be in the region of 7 g, which for example corresponds to an angular velocity of approximately three to four radian/s for a radius of movement of the centre of approximately six meters.

The maximum carriage speed is for example 2-5 m/s, preferably 3-4 m/s and, in some cases, about 3.2 m/s. The maximum acceleration due to the carriage drive is, for example, approximately 5 m/s$^2$ at approximately 2.2 radian/s (corresponding to approximately 3 g for a 6-meter radius of the centre about the major axis of rotation). In all exemplary embodiments the movement of the carriage can preferably take place against the radial acceleration forces, with a force of up to 7 g. A device with these parameters can achieve an artificial acceleration of, for example, from 1 g to 7 g in two seconds.

For driving the different components of the device according to the invention, different drive methods can be used.

Suitable drive systems that can be used for driving the carriage, and in particular as a carriage drive device for moving the carriage along the main carrier, are electric or hydraulic drives. The main drive, which is designed to rotate the main carrier, can also be a hydraulic or electric drive.

A system for supplying power may be provided, which enables the maximum peak energy that has to be supplied externally to be reduced. For rapid rotation rate changes of the main drive, for example, the energy demand is many times higher than in the case of constant operation. For example, in the case of a hydraulic drive method, a pressure reservoir is provided, which smooths out short-term demand peaks. In the case of a purely electric drive, a flywheel mass can be provided, and in particular a flywheel mass which is rotationally connected or rotatably coupled to the main drive, in order to cope with power demand peaks.

If appropriate, the main drive can be designed as an electric drive. To provide the drive, a plurality of electric drives, for example 2, 3, 4, 5, 6, 7, 8, 9, 10, 11, 12, 13, 14, 15, 16, 17, 18, 19, 20 or more drives, are preferably used. These drives have, for example, a joint power output of approximately 3-5 MW. The maximum torque generated is, for example, 1-3 MNm. The drives engage with the main carrier, for example via a sprocket or friction rings, and in particular with a central element which is connected to the main carrier, in order to drive and to rotate the main carrier about its major axis of rotation.

If appropriate, the main drive can be a hydraulic main drive. The peak power of a possible hydraulic main drive is in the region of, for example, 4-6 MW at a hydraulic power of, for example, approximately 10,600 l/min and a pressure of, for example, approximately 300 bar.

The carriage drive device can, if appropriate, be designed as a cable drive. Such a carriage drive device is known, for example, from patent application WO2010/040505 A1. In this example of a cable drive, a cable is guided around a plurality of deflection pulleys. In this case, main carrier deflection pulleys are rotatably mounted on the main carrier. There is also at least one deflection pulley, preferably two deflection pulleys, which are rotatably mounted on the carriage. The cable is also preferably fixed with one end or with both ends to the main carrier. A cable drive pulley for the cable drive is also provided. The cable drive pulley is preferably arranged coaxially to the major axis of rotation of the main drive. If the carriage is intended to be stationary, for example, with respect to the main carrier, then the cable drive pulleys and the main drive have the same rotation rate. To move the carriage on the main arm, the cable drive pulley and the main drive have a rotation rate difference. This leads to a change in length of individual cable sections and so the carriage is displaced on the main carrier. The drive of the cable drive pulley can in this case be provided in a fixed position, and in particular in the foundation.

If appropriate, the carriage drive device is designed as a hydraulic drive device. In this case a hydraulic cylinder is provided on the main carrier, which cylinder is configured as a drive for moving the carriage on the main carrier.

If appropriate, the carriage drive device is designed as a direct drive, and in particular as a direct drive with radial load compensation. The direct drive comprises, for example, drive wheels and/or gear wheels that are mounted on the carriage such that they can be driven and rotated. The wheels preferably roll over parts of the main carrier to effect a displacement of the carriage with respect to the main carrier. The drives for the wheels connected to the carriage are preferably arranged on the carriage itself.

To enable a drive and a displacement of the carriage along the main carrier even at high radial accelerations, a radial load compensation device can also be provided in addition to the direct drive. When this radial load compensation is used, for example a fixed-position drive is provided, in particular in the foundation. From this drive one or more traction elements extend up to the carriage and in particular are connected to the carriage at one end or with a rope sling. If appropriate, the traction elements are designed as a block and tackle. The traction elements or elements is or are preferably guided into the main carrier in the region of the major axis of rotation. The traction element is used primarily to compensate the radial acceleration or parts of the radial acceleration, in particular to generate a force counteracting the radial acceleration. In this solution therefore, a functional separation is made between "holding" the carriage by means of the radial load compensation device and "moving" the carriage by means of the direct drive.

In all embodiments the carriage is preferably guided on the main carrier. This guiding can be implemented, for example, as a combination of a slide rail and a sliding guide which is guided on the slide rail, wherein one of the components is preferably rigidly coupled with the carriage and one of the components with the main carrier. The carriage is preferably guided at a plurality of positions on the main carrier. For this purpose, a plurality of slide rails and a plurality of sliding guides can be provided. In the case of a U-shaped design of the main carrier, the carriage can be guided in the lower region and/or in the floor region of the U-shaped carrier. In addition, in the case of a U-shaped design of the carrier, the carriage can also be guided in the central region and/or in the region of the ends of the arms of the U-shaped carrier. Preferably, the slide rails are mounted on the main carrier along the trajectory and extend from the first main arm beyond the major axis of rotation to the second main arm.

It may be provided that the first main arm and the second main arm overhang freely from the major axis of rotation or from a central element. In this embodiment, in the outer region the main carrier is preferably free of guiding devices for providing support relative to the surroundings. However, in accordance with a further embodiment, guiding devices for supporting or mounting the overhanging parts of the main carrier can also be provided in the outer region.

The device according to the invention preferably also comprises a holding device for a person, which is coupled with the carriage via a movement device. The movement device enables one or more degrees of freedom and, in particular, driven degrees of freedom of the holding device with respect to the carriage. The holding device is preferably designed as a seat, to which a person can be strapped. Next to the seat, a simulation of a cockpit for the object to be simulated is also preferably provided. Control elements are preferably provided, using which the person can exert control on the movement or the simulation.

In accordance with a preferred configuration, the first secondary axis corresponds to the roll axis. The second secondary axis may correspond to the yaw axis. The third secondary axis according to this embodiment corresponds, for example, to the pitch axis. In accordance with a further embodiment, the first secondary axis corresponds to the yaw axis. The second secondary axis may correspond to the pitch axis. In accordance with this embodiment, the third secondary axis preferably corresponds to the roll axis.

A cabin is preferably provided, which surrounds the holding device and subsequently also the person strapped onto the holding device. On or in this cabin, an image reproduction surface is preferably provided. The carrier elements are preferably arranged in such a way that they are outside the field of view of the person at any time and in any position.

If appropriate, the cabin can be provided on the second or the third carrier element, or be rigidly connected to one of these carrier elements. This means that the holding device has one or two rotational degrees of freedom with respect to the image reproduction area. In particular, the first carrier element is configured in such a way that it is outside the field of view of the person in every position.

The cabin preferably comprises a closable opening. The opening is preferably designed in such a way that both the person and the cockpit that may be provided can be easily removed or installed. A rail system is provided for this purpose, which facilitates a guided motion of the cockpit that may be provided.

If appropriate, the first carrier element can be designed bow-shaped or C-shaped. If appropriate, the first carrier element is designed as a curved cantilever. The second carrier element can comprise, if appropriate, one or more recesses for holding one or more rotary drives. This/these rotary drive(s) are particular suitable for and/or designed for rotating the holding device about the first secondary axis.

If appropriate, the second carrier element can be designed bow-shaped or C-shaped. If appropriate, the second carrier element, which is designed C-shaped, can be rigidly fixed to the cabin. The cabin may form a part of the second carrier element.

If appropriate, the third carrier can be designed annular. If appropriate, the third carrier element may comprise recesses for holding rotary drives. These rotary drives are in particular suitable for and/or designed for rotating the holding device about the second secondary axis and, if appropriate, about the third secondary axis.

The carriage can preferably move along the trajectory into any desired intermediate positions between the two maximum positions, where it can be stopped with respect to the main carrier. The displacement of the carriage can also preferably take place during a rotation of the main carrier.

If appropriate, in all embodiments one or more data processing devices, such as a computer, are provided. These are used, for example, for open-loop or closed-loop control of drives and/or for displaying and/or calculating the simulation model.

The invention is now described further by reference to specific exemplary embodiments.

BRIEF DESCRIPTION OF THE SEVERAL VIEWS OF THE DRAWING

FIG. 1 shows a device according to the invention in a partial sectional view, wherein the direction of the trajectory of the carriage extends substantially in the projection of the image.

FIG. 2 shows a partial sectional view in a device according to the invention, wherein the trajectory of the carriage extends substantially in the image plane.

FIG. 3 shows a view of a device according to the invention from above.

FIG. 4 shows a schematic view, or sectional view of a device according to the invention.

FIG. 5 shows another schematic view, or sectional view of a device according to the invention.

DESCRIPTION OF THE INVENTION

Figure 6:
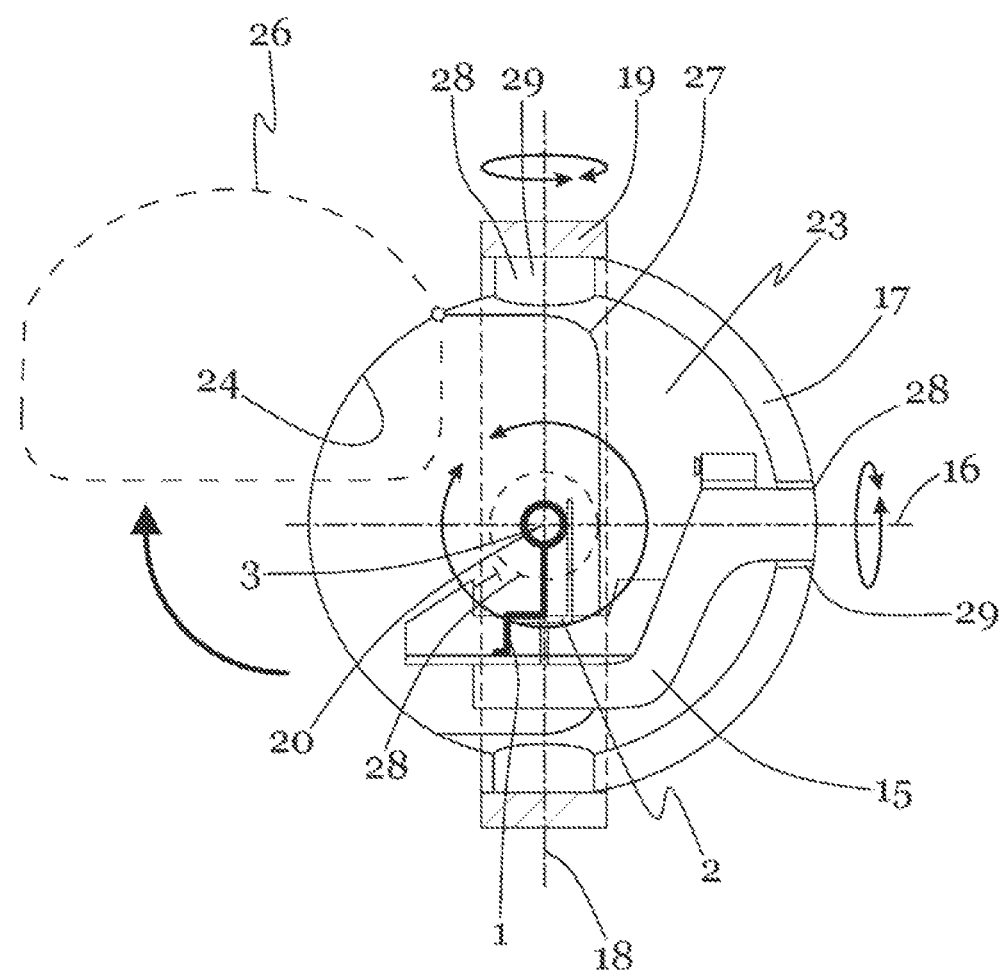
FIG. 6 shows a detail of a device according to the invention.

FIG. 1 shows a device according to the invention in a schematic view of a partial sectional representation.

The device is preferably arranged on a foundation 37. This foundation 37 can be, for example, a concrete foundation.

The foundation 37 has one or more main carrier drives 43 connected thereto. The main carrier drives 43 are parts of the main drive 35. The main drive 35 is configured and/or suitable for effecting a rotation of the main carrier 6 about the major axis of rotation is 7, and in particular to drive the main carrier 6 about the major axis of rotation 7 in a rotary manner. For this purpose, in the present design the main drive 35 comprises gear wheels, which are coupled or connected to the main carrier drives 43 which engage in a sprocket 44. The sprocket 44 is preferably rigidly connected to the main carrier 6 and in particular is arranged coaxially with the major axis of rotation 7. When the main carrier drives 43 are driven, the sprocket 44 is driven in a rotary manner, which also drives the main carrier 6. If appropriate, in addition or as an alternative to gear wheels, the main drive comprises friction wheels which effect a transmission of the torque from the main carrier drive 43 onto the main carrier 6 via friction rings. In all embodiments, either friction rings, gear wheels or a combination of the two configurations can be used for the drive of the main carrier 6.

In the area of the foundation or between the physically fixed components of the device and the main carrier 6, a main bearing 46 is preferably provided. This main bearing can be designed in particular as a radial bearing, an axial bearing, as a combination of the two types of bearing, or as a plurality of bearings arranged separately from each other. The main bearing is in particular suitable and/or configured for bearing the rotation of the main carrier 6 about the major axis of rotation 7 with respect to the physically fixed components, in particular with respect to the foundation.

The device according to the invention comprises a main carrier 6 which, as shown in this embodiment, is trough-shaped or U-shaped. If appropriate, however, in all embodiments the carrier can also be designed in different shapes. In a preferred form however, the main carrier 6 has a U-shaped profile along the displacement path of the carriage. The carriage 5 is preferably mounted and/or guided in this U-shaped profile.

The device according to the invention preferably comprises a carriage 5. This carriage 5 can be moved along a trajectory 10 along the main carrier 6 and can be driven in a moveable manner. In a preferred form the carriage 5 is guided along the main carrier 6 or on the main carrier 6. In the case of a U-shaped design of the main carrier 6, the carriage can be guided in the lower region, i.e. in the floor region of the U-shaped carrier. In addition, in the case of a U-shaped design of the carrier, the carriage can also be guided in the central region or on the ends of the arms of the U-shaped carrier. The U-shaped design and multi-point guiding enable the stability of the overall system to be improved.

The carriage can be displaced with respect to the main carrier 6. This means that the carriage has two degrees of freedom. One degree of freedom is defined by the rotation of the main carrier 6 about the major axis of rotation. A further degree of freedom is defined by the displacement of the carriage 5 along the main carrier 6. A movement device 4 is provided on the carriage 5. The movement device 4 can preferably be displaced jointly with the carriage, and therefore has at least the same degrees of freedom as the carriage. The movement device 4 is suitable and/or configured for moving a holding device 2.

This holding device 2 is in particular configured for fixing or holding a person 1 in the region of a centre 3. The holding device 2 is preferably connected to a first carrier element 15. In the present embodiment a cabin 23 is provided. This cabin 23 preferably surrounds the person 1, the holding device 2 and the centre 3. In the present embodiment the cabin 23 also surrounds the first carrier element 15, which means that the components mentioned in the present view are hidden, and hence shown by a dashed line. The holding device 2 is preferably rigidly or fixably connected to the first carrier element 15. The first carrier element 15 is arranged so that it can rotate about a first secondary axis 16 with respect to the carriage 5. A second carrier element 17 is also provided. The second carrier element 17 is arranged so that it can rotate about a second secondary axis 18 with respect to the carriage. The first carrier element 15 is preferably arranged so that it can rotate about the first secondary axis 16 with respect to the second carrier element 17. The first secondary axis 16 preferable passes through the centre 3.

A third carrier element is also preferably provided. The third carrier element 19 is arranged so that it can rotate about a third secondary axis 20 with respect to the carriage. In the present view, the third secondary axis 20 extends in the projection of the image. The second carrier element 17 is preferably arranged so that it can rotate about the second secondary axis 16 with respect to the third carrier element 19.

If appropriate, a hoisting device 21 is also provided. The hoisting device 21 allows a raising and/or lowering movement of the holding device 2 with respect to the carriage 5. The raising/lowering direction preferably extends parallel to the major axis of rotation. The third carrier element 19 is preferably arranged about a third secondary axis 20 with respect to the hoisting device 21. The third carrier element 19 is also preferably linearly moveable with respect to the carriage by means of the hoisting device 21.

It can be the case that only a first carrier element and a second carrier element are provided, wherein the first carrier element is arranged such that it can be rotated with respect to the second carrier element. If appropriate, in this embodiment the second carrier element may be coupled with the carriage via a hoisting device 21.

In the present embodiment of FIG. 1 therefore, the holding device 2 for the person 1 has six degrees of freedom, in particular four rotational degrees of freedom and two translational degrees of freedom. Three rotational degrees of freedom are defined by the rotation about the auxiliary axes 1, 6, 18 and 20. A further rotational degree of freedom is defined by the rotation of the main carrier 6 about the major axis of rotation 7. A translational degree of freedom is obtained due to the displaceability of the carriage 5 along the main carrier 6. A further translational degree of freedom is obtained by means of the hoisting device 21.

If appropriate, more or fewer degrees of freedom can be provided.

FIG. 2 shows the same or a similar device to that of FIG. 1. The main carrier 6 is arranged such that it can be rotated about a major axis of rotation 7. The major axis of rotation is preferably vertically oriented. In addition a foundation 37 is preferably also provided, in which, for example, drives or bearings for moving the device according to the invention are or can be arranged. Details of the drive are hidden in FIG. 2. The carriage 5 is arranged such that it can be displaced along the main carrier 6. The main carrier 6 preferably comprises a first main arm 8 and a second main arm 9. The main arms 8, 9 preferably extend substantially radially outwards from the major axis of rotation 7. In a preferred manner the two main arms 8, 9 are chained linearly together, producing a linear trajectory 10 of the carriage 5 on the main carrier 6. If appropriate, however, in all embodiments the trajectory 10 may be designed slightly curved or partially curved. It is preferable in all embodiments to arrange the trajectory 10 linearly along the carrier. By displacing the carriage 5 along the trajectory 10, the centre 3 can be moved from a first outer maximum position 11 to a second outer maximum position 12. The trajectory 10 therefore extends from the first outer maximum position 11 of the centre to the second outer maximum position 12 of the centre 3 and in particular, is limited by the two maximum positions in all embodiments. In the first outer maximum position 11 the carriage is preferably located on the first main arm 8, and in particular in the outer region of the first main arm 8. In the second outer maximum position of the centre 3 the carriage is located on the second main arm 9, and in particular in the outer region of the second main arm 9. In the present illustration this alternative position is drawn as a dashed line. According to the invention, it is provided that the first normal distance 13 of the centre 3 from the major axis of rotation 7 in the first outer maximum position 11 is greater than the second normal distance 14 between the major axis of rotation 7 and the centre 3 in the second outer maximum position 12.

It may be the case that the dimension 47 of the first main arm 8 is greater than the dimension 48 of the second main arm 9.

At constant angular velocity of the main arm, the radial acceleration acting on the person 1 can be changed due to the fact that the centre 3 is pushed outwards along the trajectory. Since the maximum radius of the centre 3 on the first main arm 8 is greater than that on the second main arm 9, by moving the carriage 5 along the first main arm 8 at a constant angular velocity a higher radial acceleration can be induced than that on the second main arm 9. In all embodiments the carriage 5 can be moved into any desired intermediate position between the two maximum positions 11, 12.

The device shown in FIG. 2 may in particular be designed in the same way as the device shown in FIG. 1. In particular, the degrees of freedom of the holding device 2 with respect to the environment can also be designed the same as in the description of FIG. 1. In particular in the embodiment shown in FIG. 2 also, six degrees of freedom are preferably obtained. If appropriate, however, the holding device 2 or the person 1 may also have fewer or more degrees of freedom with respect to the environment.

FIG. 3 shows an embodiment of a device according to the invention or of a system according to the invention, from above. The device comprises a main carrier 6. This main carrier 6 is mounted rotatably about a major axis of rotation 7 and preferably is or can be driven. The major axis of rotation 7 extends in the projection of the image in this view.

The main carrier 6 preferably has a first main arm 8 and a second main arm 9. The two main arms 8 and 9 project out on both sides of the major axis of rotation 7 or extend away from this major axis of rotation 7. the main carrier 6 is preferably designed in such a way that the first main arm 8 and the second main arm 9 are chained together in a straight line. A carriage 5 is arranged on the main carrier 6. The carriage 5 can be displaced along a trajectory 10 along the main carrier 6.

In particular, the trajectory 10 extends along the main carrier 6 from the first main arm 8 beyond the major axis of rotation 7 to the second main arm 9. The carriage 5 can therefore be moved from the first main arm 8 onto the second main arm 9. In all embodiments the carriage 5 can preferably be displaced from the region of the major axis of rotation 7 on both sides. A movement device 4 is provided on the carriage 5. The movement device 4 can, in particular, correspond to the movement devices of the other embodiments. Using the movement device 4 a holding device 2 for a person 1, both elements 2, 1 not being visible in the present view, can be rotated or moved with respect to the carriage 5 and to the environment.

In particular, the movement device 4 comprises a first carrier element 15, a second carrier element 17 and possibly a third carrier element 19. These three carrier elements 15, 17, 19 can, if appropriate, be rotated about secondary axes 16, 18, 20. A hoisting device 21 is preferably also provided. using the hoisting device 21, the holding device 2 or the person 1 can be moved translationally with respect to the main carrier 6. In particular, the direction of movement of the hoist device 21 is arranged parallel to the major axis of rotation 7.

A cabin 23 is preferably provided. The holding device 2 is provided in the cabin 23. The holding device 2 is suitable and/or configured for positioning or holding a person 1 in the region of the centre 3. The centre 3 can be moved along the trajectory 10 by activating the carriage 5.

In particular, the centre 3 can be moved from a first outer maximum position 11 to a second outer maximum position 12. The first normal distance 13 of the centre from the major axis of rotation 7 is preferably greater than the second normal distance 14 of the second outer maximum position 12 from the major axis of rotation 7. This allows the centre to be moved further out along the first main arm 8 than along the second main arm 9. If appropriate, the entire main carrier 6 can be arranged asymmetrically. In such a design the dimension 47 of the first main arm 8 is greater than the dimension 48 of the second main arm 9. The dimensions 47, 48 each extend substantially normally from the major axis of rotation 7 up to the outer end of the first or second main arm, or of the main carrier.

In the present illustration of FIG. 3, a drive device 30 is provided for moving the carriage 5. The carriage drive device 30 in this embodiment is designed as a cable drive. In such a device, a cable 33 is passed around a plurality of deflection pulleys 32. The cable 33 is also passed around a cable drive pulley 34. By rotating the cable drive pulley 34 the cable or parts of the cable can be moved, to also displace the carriage 5 on the main carrier 6. A drive 36 is provided for this purpose. This drive 36 is preferably arranged in a fixed position.

If appropriate, however, this drive 36 or parts of the drive 36 can also be provided on the main carrier. A deflection pulley 32 may be designed as a tensioner pulley. This tensioner pulley is configured to hold the cable under tension in each operating position. The tensioner pulley in this view is the pulley that is arranged closest to the cable drive pulley 34. The cable drive of the following embodiment also comprises a plurality of main carrier deflection pulleys 31. The main carrier deflection pulleys 31 are preferably arranged on the main carrier 6 such that they can rotate. In addition, deflection pulleys are located on the carriage 32 such that they can rotate.

The cable 33 or the cables 33 are passed over all pulleys shown in the drawing. The cable is preferably fixed to one or more sections of the main carrier 6. By activating the cable drive pulley 34, in particular by means of the drive 36 of the cable drive pulley 34, the carriage 5 can be displaced on the main carrier by changing the length of the cable sections or cable slings.

FIG. 4 shows a further configuration of a device according to the invention. In contrast to the illustration of FIG. 3, in order to move the carriage 5 on the main carrier 6, the carriage drive device 30 comprises one or more drive wheels 39, which roll over an element of the main carrier 6. All other components correspond to the components of FIG. 1, FIG. 2 or FIG. 3 as appropriate. The drive wheels 39 preferably comprise one or more drives 40. The drives 40 are configured and/or suitable for driving the drive wheel 39 or drive wheels 39, and therefore effecting a displacement of the carriage 5 on the main carrier 6. The drives 40 can, if appropriate, be arranged on the carriage, or be moveable together with the carriage.

At high radial accelerations, in order to brace the displacement of the carriage by means of the drive wheels 39 it may be necessary to provide another drive. In accordance with the present embodiment this additional drive is designed as a radial load compensation drive 41. The radial load compensation drive 41 preferably comprises a traction element 42, which is connected to the carriage 5 or engages with the carriage 5. The traction element 42 is driven by a drive 36.

If appropriate, the traction element 42 is arranged in the form of a block and tackle.

If appropriate, the radial load compensation drive 41 comprises a block and tackle. The traction element 42 is preferably designed as a flexible traction element, such as in particular a cable. The traction element 42 is preferably guided into the main carrier 6 in the region of the major axis of rotation 7. In the region where the traction element 42 passes through into the main carrier 6, deflection pulleys 32 are also provided. The deflection pulleys 32 divert the traction element from the preferably fixed drive, so that a section of the traction element 42 can engage with the carriage 5. This means that the traction element 42 comprises a section which is provided between carriage and deflection pulley 32. This section extends substantially at an oblique angle or preferably horizontally. Between the drive of the traction element 42 and the deflection pulley 32, a second section of the traction element 42 is provided. This extends substantially at an oblique angle or preferably vertically.

The configuration of the direct drive using one or more drive wheels 39 and the radial load compensation drive 41 results in a division of forces between "holding" the carriage against the radial acceleration forces by the radial load compensation drive 41 and "moving" the carriage on the main carrier 6 by driven drive wheels 39.

FIG. 5 shows a further embodiment of a possible carriage drive device 30 and a schematic hydraulic circuit diagram of this embodiment. The carriage drive device 30 of the embodiment shown in FIG. 5 comprises a hydraulic cylinder 38, which can be designed as appropriate as a conventional, adequately dimensioned hydraulic cylinder 38. All other components correspond to the components of FIG. 1, FIG. 2 or FIG. 3 as appropriate. The hydraulic cylinder 38 is provided on the main carrier 6 and in particular is co-rotated about the major axis of rotation 7. Changes in the length of the hydraulic cylinder 38 enable a traction element 42 to be moved. This traction element 42 engages with the carriage 5 in order to move the carriage along the main carrier 6. If appropriate, the traction element 42 can be designed as a pressure element.

If appropriate, the traction element can be a rod, which is designed as a push-and-pull element. If appropriate, the traction element 42 is designed in the form of a cable.

A plurality of hydraulic cylinders 38 may be provided, which act against each other and thus improve the ability to displace the carriage on the main carrier. If appropriate however, only a single hydraulic cylinder 38 is provided, which can move the carriage along the first main arm and the second main arm and in particular, from the first maximum position of the centre as far as the second maximum position of the centre.

FIG. 6 shows a further detail of a design of the device according to the invention in a schematic view. If appropriate, the movement device 4 and the cabin 23 are designed in all embodiments as shown in FIG. 6. In the present embodiment the cabin 23 comprises a cabin door 26. The cabin door 26 is designed such that it can be opened and closed. The cabin door closes a cabin opening 27 as appropriate. It is preferable to design the cabin door 26 such that it completes the shape of the cabin 23. For example, the cabin can have a spherical shape or a spherical inner surface.

In particular, an image reproduction surface 24 is provided on the inner side of the cabin. The image reproduction surface preferably extends over the entire visual field or the entire field of view of the person 1. If appropriate, a projector or a plurality of projectors is provided, by means of which the images, in particular images of the simulated environment artificially generated by a computer, can be projected onto the image reproduction surface 24.

The person 1 is held on a holding device 2. The holding device is designed, for example, as a seat or a couch. The holding device preferably comprises belts, so that the person can be fastened to the holding device 2. The holding device is in particular configured for positioning the person 1 in the region of a centre 3. In all embodiments the person's head is preferably positioned in the centre. If appropriate, in all embodiments the chest or the heart of the person can be positioned in the centre 3. The holding device 2 preferably comprises an adjustable degree of freedom with respect to the first carrier element 15. This degree of freedom is defined, for example, by a seat adjustment.

In particular, it may be necessary to provide an adjustment facility of the holding device with respect to the first carrier element 15, in order to provide the facility to position the person 1 with respect to the centre. The holding device can be rotated together with the first carrier element about a first secondary axis 16. This rotation of the first carrier element about the axis of rotation 16 takes place in particular with respect to the second carrier element 17. In the present embodiment the first carrier element 15 is designed as a cantilever or as a curved overhanging carrier. In the rear region, in particular behind the person 1, the first carrier element 15 is guided relative to the second carrier element 17, and can be rotatably mounted therein or thereon. In addition, the rotary drive 29 is provided for rotating the first carrier element with respect to the second carrier element. In the present embodiment the second carrier element 17 is designed substantially C-shaped. If appropriate, the second carrier element is a part of the cabin 23. The cabin 23 may have a stiffening effect for the second carrier element 17.

If appropriate, the second carrier element 17 can have a recess 28. In this recess 28, the rotary drive 29 and, if appropriate, the bearing for the rotation of the first carrier element with respect to the second carrier element can be provided. The second carrier element 17 is arranged such that it can rotate with respect to a third carrier element 19. In particular, the rotation takes place about a second secondary axis 18. The third carrier element 19 is designed, for example, annularly and may extend right around the cabin 23. In the present illustration the main parts of the ring which can be seen are the intersecting faces.

The third carrier element 19 is preferably arranged so that it can rotate about a third secondary axis 20 with respect to the carriage. In this illustration, the third secondary axis 20 extends in the projection of the image. To rotate the second carrier element item 17 or the third carrier element 19, more than one, and at least two, rotary drives 29 are provided in the third carrier element 19. The rotary drives 29 can be provided in particular in recesses 28 of the third carrier element. Preferably, the three secondary axes 1, 6, 18, 20 have their shortest normal distance from each other in the region of the centre 3. The three secondary axes 1, 6, 18, 20 preferably intersect each other in the centre 3. In the present embodiment the first secondary axis corresponds to the roll axis of the person 1. The person 1 and, in particular, the holding device, may have a rotational degree of freedom with respect to the cabin 23 and in particular with respect to the image reproduction surface 24, which is preferably a rolling rotational degree of freedom.

In the present configuration the second secondary axis 18 preferably corresponds to the yaw axis. The third secondary axis 20 preferably corresponds to the pitch axis. By rotating the person, for example by 90°, about the first secondary axis however, the second secondary axis and the third secondary axis change their orientation with respect to the person, so that the second secondary axis corresponds to the pitch axis and the third secondary axis to the yaw axis.

LIST OF REFERENCE NUMERALS 1 person
2 holding device
3 centre
4 movement device
5 carriage
6 main carrier 7 major axis of rotation
8 first main arm
9 second main arm
10 trajectory
11 first outer maximum position
12 second outer maximum position
13 first normal distance
14 second normal distance
15 first carrier element
16 first secondary axis
17 second carrier element
18 second secondary axis
19 third carrier element
20 third secondary axis
21 hoisting device
22 linear drive
23 cabin
24 image reproduction surface
25 control element
26 cabin door
27 lockable cabin opening
28 recesses
29 rotary drive
30 carriage drive device
31 main carrier deflection pulley
32 deflection pulley
33 cable
34 cable drive pulley
35 main drive
36 drive for cable drive pulley
37 foundation
38 hydraulic cylinder
39 drive wheel
40 drive for drive wheel
41 radial load compensation drive
42 traction element
43 main carrier drive
44 sprocket
45 friction ring
46 main bearing
47 dimension of first main arm
48 dimension of second main arm

The invention claimed is:

1. A device for a spatial movement of at least one person, the device comprising:
    a carriage;
    a movement device disposed on said carriage;
    a horizontally oriented main carrier, said carriage is displaceable along said main carrier;
    a holding device for holding the person in a region of a center of said carriage, said holding device being mounted by means of said movement device on said carriage;
    a main drive, said main carrier is rotatably mounted about a vertically oriented major axis of rotation and being driven by said main drive; and
    said main carrier having a first main arm and a second main arm, wherein said first and second main arms extend radially outwards in opposite directions from the vertically oriented major axis of rotation, wherein the center of said carriage can be displaced between a first outer maximum position and a second outer maximum position by moving said carriage along a trajectory on said main carrier, wherein in the first outer maximum position of the center of said carriage said carriage is disposed on said first main arm, wherein in the second outer maximum position of the center of said carriage said carriage is disposed on said second main arm, wherein a normal distance between the first outer maximum position of the center of said carriage and the vertically oriented major axis of rotation is greater than a normal distance between the second outer maximum position of the center of said carriage and the vertically oriented major axis of rotation.

2. The device according to claim 1, wherein the trajectory of the center of said carriage along said main carrier is limited by the first outer maximum position and the second outer maximum position.

3. The device according to claim 1, wherein said first main arm, measured normally with respect to the vertically oriented major axis of rotation, is longer than said second main arm or that the vertically oriented major axis of rotation is disposed asymmetrically with respect to said main carrier along a longitudinal extension of said main carrier.

4. The device according to claim 1, wherein said main carrier has a trough-shaped or U-shaped profile along the trajectory, and said carriage is guided on or in said main carrier and at least partially encompassed by said main carrier.

5. The device according to claim 1, wherein said movement device has a first carrier element, which is disposed rigidly connected to said holding device, said first carrier element is rotatably driven with respect to said carriage about a first secondary axis, and the first secondary axis passes through the center of said carriage.

6. The device according to claim 5, wherein the first secondary axis corresponds to a roll axis of the person.

7. The device according to claim 1, wherein:
    said movement device has a first carrier element, which is disposed rigidly connected to said holding device, said first carrier element is rotationally driven with respect to said carriage about a first secondary axis, the first secondary axis passes through the center of said carriage; and
    said movement device has a second carrier element, said first carrier element is rotationally driven with respect to said second carrier element about the first secondary axis, and said second carrier element is rotationally driven with respect to said carriage about a second secondary axis, the first secondary axis and the second secondary axis are substantially orthogonal to each other and that the first secondary axis and the second secondary axis have a smallest normal distance from each other in the center of said carriage or intersect in the center of said carriage.

8. The device according to claim 7, wherein said first carrier element is configured as a cantilever which on one side, behind said holding device, is rotatably connected to said second carrier element, so that said first carrier element extends behind and/or below the person from said holding device to said second carrier element.

9. The device according to claim 1, wherein:
    said movement device contains a first carrier element, which is disposed rigidly connected to said holding device, said first carrier element is rotatably driven with respect to said carriage about a first secondary axis, the first secondary axis passes through the center of said carriage;
    said movement device has a second carrier element, said first carrier element is rotationally driven with respect to said second carrier element about the first secondary axis, said second carrier element is rotationally driven with respect to said carriage about a second secondary axis, the first secondary axis and the second secondary axis are substantially orthogonal to each other, the first secondary axis and the second secondary axis have a smallest normal distance from each other in the center of said carriage or intersect in the center of said carriage; and said movement device has a third carrier element, said second carrier element is rotationally driven with respect to said third carrier element about the second secondary axis, said third carrier element is rotationally driven with respect to said carriage about a third secondary axis, the second secondary axis and the third secondary axis are substantially orthogonal to each other and that the second secondary axis and the third secondary axis have a smallest normal distance from each other in the center of said carriage or intersect in the center of said carriage.

10. The device according to claim 9, wherein said movement device contains a hoisting device for a translational movement of said holding device, of said first carrier element, of said second carrier element and/or, of said third carrier element.

11. The device according to claim 10, wherein said movement device having said hoisting device extends substantially parallel to the vertically oriented major axis of rotation and/or normally to the trajectory, and said hoisting device contains at least one linear drive.

12. The device according to claim 10, wherein said hoisting device engages on said third carrier element in a region of the third secondary axis.

13. The device according to claim 9, further comprising:
an image reproduction surface; and
a cabin, said holding device is disposed in said cabin, and said image reproduction surface for a graphical representation of a simulation environment is disposed in said cabin.

14. The device according to claim 13, further comprising a replica of an object to be simulated is provided in said cabin, said replica of the object to be simulated is selected from the group consisting of an aircraft cockpit, a vehicle cockpit, a helicopter cockpit and a ship cockpit.

15. The device according to claim 14, further comprising:
a control device; and
control elements disposed in a region of said holding device, said control elements are connected to said control device, and a movement of the device, namely a simulation, is influenced using said control elements, so that the person located in said cabin can control a simulated object or the movement of the device.

16. The device according to claim 13, wherein said cabin is configured so that said cabin is closable, said cabin has a cabin door and a cabin opening which is closed by said cabin door.

17. The device according to claim 13, wherein at least one of said image reproduction surface or said cabin is disposed on said second carrier element or on said third carrier element, so that said holding device has at least one drivable rotational degree of freedom relative to at least one of said image reproduction surface or said cabin.

18. The device according to claim 13, wherein said second carrier element is configured annular or C-shaped and is rigidly connected to said cabin, or said second carrier element contains an annular or C-shaped section and said cabin is part of said second carrier element.

19. The device according to claim 13, wherein said third carrier element is configured annular and extends around said cabin.

20. The device according to claim 9,
further comprising rotary drives;
wherein said third carrier element is configured annular and extends around said cabin, said third carrier element has recesses formed therein for accommodating said rotary drives; and
wherein said rotary drives disposed in said third carrier element are configured to rotate said second carrier element about the second secondary axis and to rotate said third carrier element about the third secondary axis.

21. The device according to claim 1, further comprising a carriage drive device, said carriage is displaced on said main carrier by means of said carriage drive device.

22. The device according to claim 21, wherein said carriage is displaceable on said main carrier by means of said carriage drive device, wherein said carriage drive device is selected from the group consisting of a cable drive, a hydraulic drive, a direct drive and a direct drive with radial load compensation.

23. The device according to claim 21, wherein said carriage drive device is a cable drive containing:
a plurality of deflection pulleys, at least one of said deflection pulleys being rotatably mounted on said carriage;
a cable guided around said plurality of deflection pulleys and is partially fixed to said main carrier with one end, with both ends or with at least one section to said main carrier;
main carrier deflection pulleys which are rotatably mounted on said main carrier, said main carrier deflection pulleys being disposed on both outer regions of said main carrier; and
a cable drive pulley for driving said cable drive.

24. The device according to claim 23, wherein:
said cable drive pulley is disposed coaxially to the vertically oriented major axis of rotation of said main drive; and
when said carriage is stationary with respect to said main carrier, said cable drive pulley and said main drive have a same angular velocity, and wherein to move said carriage on said main carrier, said cable drive pulley and said main drive have an angular velocity difference.

25. The device according to claim 23, wherein said cable drive pulley has a drive disposed in a fixed position.

26. The device according to claim 21, wherein:
said carriage drive device is a hydraulic drive device; and
said main drive for displacing said carriage on said main carrier is a hydraulic cylinder.

27. The device according to claim 21, wherein said carriage drive device is a direct drive, said direct drive has drive wheels, which are mounted on said carriage so that they can be rotated and driven, said drive wheels roll over parts of said main carrier to cause a displacement of said carriage with respect to said main carrier, and said direct drive further has drives for said drive wheels that are connected to said carriage and are disposed on said carriage itself.

28. The device according to claim 21,
wherein said carriage drive device is a direct drive with additional radial load compensation;
further comprising a foundation;
further comprising a radial load compensation drive disposed in a fixed position in said foundation; and
further comprising at least one traction element extending from said radial load compensation drive as far as said carriage, and is connected at one end to said carriage, so that said traction element primarily compensates for a radial acceleration in order to generate a counterforce to the radial acceleration and a functional separation is created between "holding" said carriage by means of the radial load compensation and "moving" said carriage by means of said direct drive.

29. The device according to claim 28, wherein said traction element is guided into said main carrier in a region of the vertically oriented major axis of rotation.

30. The device according to claim 28, wherein said traction element is configured as a block and tackle.

31. The device according to claim 1, wherein said main drive contains a hydraulic main carrier drive or an electric main carrier drive for rotating said main carrier about the vertically oriented major axis of rotation.

32. The device according to claim 31, wherein said main drive contains a plurality of main carrier drives.

33. The device according to claim 31, further comprising an engagement device selected from the group consisting of a sprocket with a central element and friction rings with a central element, said main carrier drives engage via said sprocket or said friction rings with said central element connected to said main carrier, to drive said main carrier in a rotary manner about the vertically oriented major axis of rotation.

34. The device according to claim 1, wherein the normal distance of the center of said carriage from the vertically oriented major axis of rotation in the first outer maximum position is between 4 and 8 meters.

35. The device according to claim 1, wherein the normal distance of the center of said carriage from the major axis of rotation in the second outer maximum position is between 0 and 4 meters.

36. The device according to claim 1, wherein the normal distance of the center of said carriage from the vertically oriented major axis of rotation in the first outer maximum position is at least 2 times greater than the normal distance of the center of said carriage from the vertically oriented major axis of rotation in the second outer maximum position.

37. A simulator selected from the group consisting of a flight simulator and a motion simulator for a spatial movement of at least one person and for a simulation of acceleration sequences, the simulator comprising:
  a carriage;
  a movement device;
  a holding device for holding the person in a region of a center of said carriage, said holding device is mounted on said carriage by means of said movement device; and
  a horizontally oriented main carrier, said carriage is displaceable along said main carrier, said main carrier is rotatably mounted, and is driven about a vertically oriented major axis of rotation, wherein said main carrier has a first main arm and a second main arm, wherein said first and second main arms extend radially outwards in opposite directions from the vertically oriented major axis of rotation, and wherein said carriage is displaced along said first main arm and said second main arm, said first main arm, measured normally with respect to the vertically oriented major axis of rotation, is longer than said second main arm or that the vertically oriented major axis of rotation is disposed asymmetrically relative to said main carrier along a longitudinal extension of said main carrier.

* * * * *